United States Patent
Girod et al.

(10) Patent No.: US 7,703,580 B2
(45) Date of Patent: Apr. 27, 2010

(54) ACTUATOR FOR AN ELECTROMECHANICAL BRAKE, A BRAKE INCLUDING SUCH AN ACTUATOR, A VEHICLE INCLUDING AT LEAST ONE SUCH BRAKE, AND A METHOD OF IMPLEMENTING SAID ACTUATOR

(75) Inventors: Pierre Girod, Paris (FR); Patrick Quesne, Ecouflant (FR)

(73) Assignee: Messier-Bugatti, Avrille (FR)

( * ) Notice: Subject to any disclaimer, the term of this patent is extended or adjusted under 35 U.S.C. 154(b) by 0 days.

(21) Appl. No.: 10/895,905

(22) Filed: Jul. 22, 2004

(65) Prior Publication Data
US 2005/0039990 A1   Feb. 24, 2005

(30) Foreign Application Priority Data
Jul. 25, 2003   (FR)   ................... 03 09135

(51) Int. Cl.
*F16D 55/08* (2006.01)
*F16D 65/52* (2006.01)
(52) U.S. Cl. .............. 188/72.1; 188/71.5; 188/73.1
(58) Field of Classification Search ............ 188/72.1 O, 188/71.5 X, 196 V, 71.9, 73.1 X, 72.8
See application file for complete search history.

(56) References Cited

U.S. PATENT DOCUMENTS

| 4,406,352 | A | * | 9/1983 | Scott et al. | 188/72.8 |
|---|---|---|---|---|---|
| 4,765,140 | A | * | 8/1988 | Imoto et al. | 188/72.1 |
| 4,854,424 | A | * | 8/1989 | Yamatoh et al. | 188/72.1 |
| 4,890,027 | A | * | 12/1989 | Bohner et al. | 310/328 |
| 5,090,518 | A |   | 2/1992 | McGraw et al. |  |
| 6,125,974 | A | * | 10/2000 | Nishizawa et al. | 188/73.35 |
| 6,179,097 | B1 |   | 1/2001 | Schumann |  |
| 6,367,597 | B1 | * | 4/2002 | De Vries et al. | 188/196 V |
| 6,483,217 | B1 | * | 11/2002 | Roth-Stielow et al. | 310/93 |
| 6,554,109 | B1 | * | 4/2003 | Olschewski et al. | 188/72.8 |
| 6,598,714 | B1 | * | 7/2003 | Rinsma et al. | 188/71.9 |
| 2002/0129999 | A1 | * | 9/2002 | Peter | 188/162 |
| 2004/0040797 | A1 | * | 3/2004 | Plude et al. | 188/156 |

FOREIGN PATENT DOCUMENTS

| DE | 198 58 764 A1 | 6/2000 |
|---|---|---|
| EP | 0984 190 A2 | 3/2000 |
| FR | 2 557 241 A1 | 6/1985 |

\* cited by examiner

*Primary Examiner*—Melody M Burch
(74) *Attorney, Agent, or Firm*—Sughrue Mion, PLLC

(57) ABSTRACT

The invention relates to an actuator for an electromechanical brake, the actuator comprising a pusher and a first drive member arranged to move the pusher in register with a stack of disks and to apply a braking pressure to the stack of disks, the actuator including a second drive member comprising a piezoelectric assembly suitable for modulating the braking pressure applied to the stack of disks. According to the invention, the piezoelectric assembly is disposed inside the actuator so as to present an end that is stationary.

12 Claims, 2 Drawing Sheets

ACTUATOR FOR AN ELECTROMECHANICAL BRAKE, A BRAKE INCLUDING SUCH AN ACTUATOR, A VEHICLE INCLUDING AT LEAST ONE SUCH BRAKE, AND A METHOD OF IMPLEMENTING SAID ACTUATOR

The invention relates to an actuator for an electromechanical brake, a brake including such an actuator, a vehicle including at least one such brake, and a method of implementing said actuator.

BACKGROUND OF THE INVENTION

Electromechanical brakes are known that comprise a stack of disks and at least one actuator which comprises a pusher and an electric motor arranged to move the pusher in register with the stack of disks so as to press the pusher against the stack.

The electric motor is controlled to press the pusher against the stack of disks with pressure that is equal to a nominal pressure that is a function of the desired braking intensity, which nominal pressure may be modulated in response to detecting slip of the wheels braked in this way, so as to prevent said wheels from locking.

The electric motor must therefore be dimensioned to perform the following functions:
  a rapid approach of the pusher towards the stack of disks, under negligible torque;
  the application of nominal pressure to the stack of disks, at a controlled speed that is generally slow but under high torque; and
  modulating the nominal pressure, which requires displacements to be performed that are short but very rapid, and under high torque.

The third condition is very constraining and requires powerful motors to be used, and thus motors that are heavy and that present the drawback of large inertia.

Proposals have been made, for example in document DE 198 58 764 A, to place a piezoelectric assembly in the pusher of the actuator, the piezoelectric assembly serving to modulate the nominal pressure, while the electric motor is used solely to apply the nominal pressure, thus making it possible to use electric motors of lower power, that are thus lighter in weight, and that consume less electricity.

Nevertheless, in the configuration proposed in that document, the piezoelectric assembly moves with the pusher, thereby complicating the provision of electrical connections to the piezoelectric assembly.

The state of the art is also illustrated by the following documents U.S. Pat. No. 5,090,518 A, U.S. Pat. No. 6,179,097 A, or indeed EP 0 984 190 A.

OBJECT OF THE INVENTION

An object of the invention is to provide an actuator for an electromechanical brake, the actuator including a piezoelectric assembly in which electrical connection to the piezoelectric element is particularly simple.

BRIEF SUMMARY OF THE INVENTION

More precisely, the invention provides an actuator for an electromechanical brake, the actuator comprising a pusher and a first drive member arranged to move the pusher in register with a stack of disks and to apply a braking pressure to the stack of disks, the actuator including a second drive member comprising a piezoelectric assembly suitable for modulating the braking pressure applied to the stack of disks, in which, according to the invention, the piezoelectric assembly is disposed inside the actuator so as to present an end that is stationary.

Thus, the piezoelectric assembly does not move with the pusher, thereby considerably facilitating the provision of electrical connections thereto, whether the connection is for the purpose of powering it or for reading a voltage across its terminals. There is no longer any need to provide connections with free wires, or even with sliding contacts or slip-rings, which are factors that reduce the reliability of the actuator.

In a preferred embodiment of the invention, the actuator comprises:
  a housing in which the pusher slides along a sliding axis;
  a sleeve disposed inside the housing around the pusher to turn about said sliding axis and connect it to said pusher via a helical connection;
  an electric motor forming the first drive member which is disposed inside the housing around the sleeve and which is arranged to drive said sleeve in rotation; and
  the piezoelectric assembly which is tubular in shape and which is disposed inside the housing and around the electric motor, said piezoelectric assembly having, in addition to the stationary end, another end forming an axial abutment for the sleeve, the piezoelectric assembly being arranged to cause the sleeve to move in a direction parallel to the sliding axis.

In a particular aspect of the invention, the electric motor is connected to the pusher via an irreversible drive system.

Advantageously, the actuator is associated with means for measuring an electric voltage across the terminals of the piezoelectric assembly.

The invention also provides a brake including at least one such actuator, and a vehicle including at least one such brake.

The invention also provides a method of implementing an electromechanical actuator of the invention in which the voltage across the terminals of the piezoelectric assembly is sensed, at least while the actuator is not active.

BRIEF DESCRIPTION OF THE DRAWINGS

The invention will be better understood in the light of the following description given with reference to the figures of the accompanying drawings, in which.

DETAILED DESCRIPTION OF THE INVENTION

Figure 1:
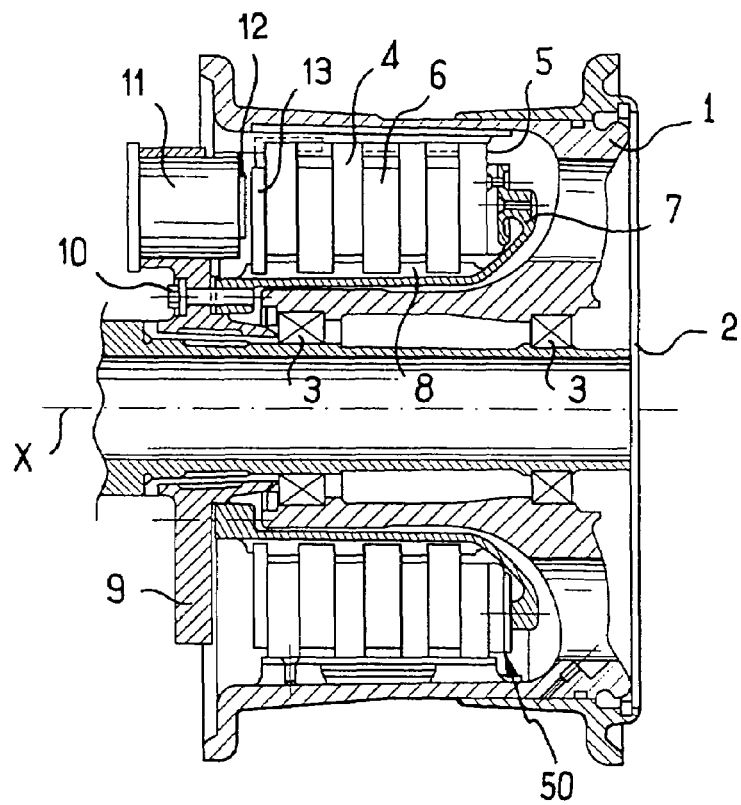
FIG. 1 is a section view of an aircraft electromechanical brake of the invention.

With reference to FIG. 1, an airplane wheel 1 is mounted to rotate on an axle 2 via bearings 3 about an axis of rotation X. The wheel 1 is fitted with a brake comprising a stack of disks having a central axis coinciding with the axis X and made up of rotor disks 4 which are constrained to rotate with the wheel 1 by peripheral splines 5, and stator disks 6 which are disposed in alternation with the rotor disks 4 and which are constrained in rotation with a torsion tube 7 via inner splines 8. The torsion tube 7 is itself connected to a ring 9 by screws 10. The ring 9 is prevented from turning relative to the axle 2 by stop means (not shown herein), so that the stator disks 6 do not rotate.

The ring 9 carries electromechanical actuators 11, only one of which is shown in FIG. 1. Each actuator 11 has a pusher 12 that is movable in translation, and that is actuated by a drive member (not shown herein) to compress the stack of disks via a presser plate 13.

The electromechanical actuators 11 are arranged to circumferentially around the ring 9, being distributed around the central axis X.

Figure 2:
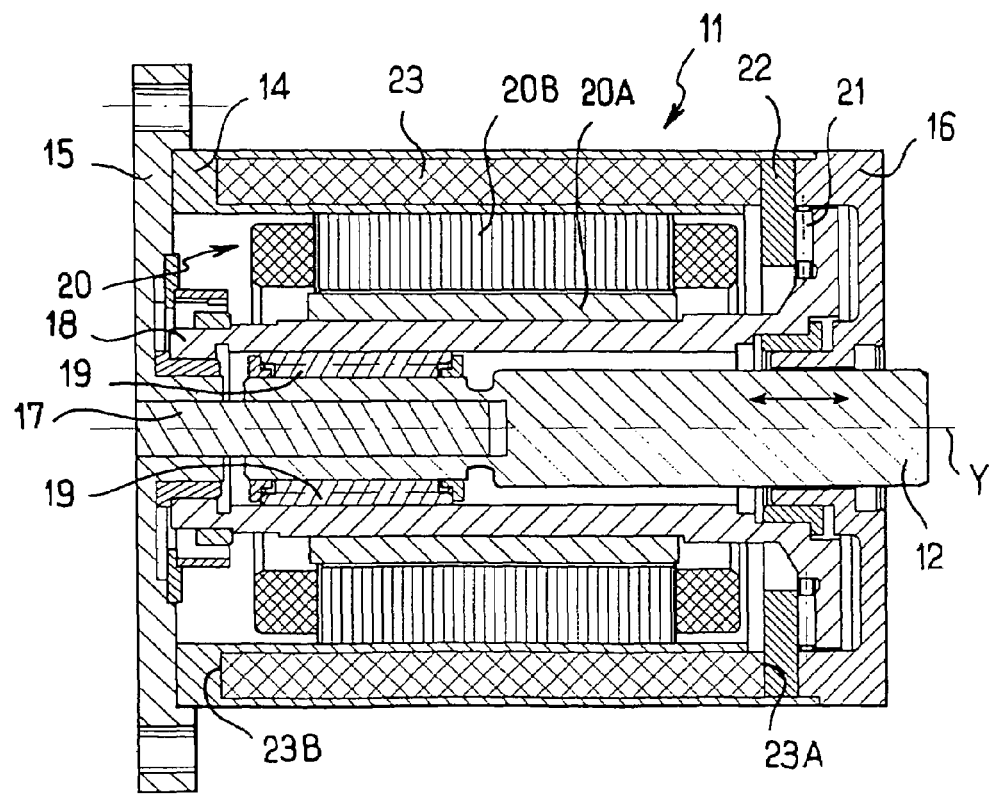
FIG. 2 is a section view of an electromechanical actuator fitted to the brake shown in FIG. 1.

With reference to FIG. 2, each actuator 11 comprises a housing, which in this case comprises a cylindrical body 14, an end wall 15 which forms a plate for fastening to the ring 9, and a cap 16.

The pusher 12 is mounted to slide in the housing along a sliding axis Y which is essentially parallel to the axis X when the actuator 11 is mounted on the ring 9. A rod 17 secured to the end wall 15 and of profile that is non-circular (e.g. hexagonal) is engaged in a cavity of complementary shape in the pusher 12 to prevent the pusher 12 from turning relative to the housing of the actuator.

A sleeve 18 extends around the pusher 12 and is mounted to turn about the axis Y inside the housing. The sleeve 18 is connected to the pusher 12 via a helical connection provided by threaded satellite rollers 19 which are constrained to move longitudinally together with the pusher 12 and which co-operate with an inside thread of the sleeve (not shown).

An electric motor 20 extends around the sleeve 18 and comprises a rotor 20A constrained to rotate with the sleeve 18 and a stator 20B mounted stationary inside the housing.

When the electric motor 20 is powered, rotation is imparted to the rotor 20A which entrains the sleeve 18. Rotation of the sleeve 18 thus leads to the pusher 12 being moved axially in the corresponding direction along the axis Y.

The sleeve 18 is stopped axially by a roller abutment 21 which bears against a washer 22.

The washer 22 itself bears against one of the ends 23A of a piezoelectric assembly 23, which in this case is a unitary assembly in the form of a hollow cylinder extending around the motor 20, being received in the cylindrical body 14 of the housing.

According to an essential disposition of the invention, the piezoelectric assembly 23 is disposed in the actuator so as to present an end which is stationary, in this case the end 23B which presses against a stationary portion of the housing, specifically an inside face of the cylindrical body 14.

This disposition makes it very simple to organize electrical power supply to the piezoelectric assembly 23 since, unlike the prior art, the assembly does not move inside the actuator.

When an electric voltage is applied to the piezoelectric assembly 23 between two terminals of said piezoelectric assembly, and in particular between the outer periphery and the inner periphery of said assembly, it expands or contracts (inverse piezoelectric effect) in a direction parallel to the axis Y.

The actuator operates as follows.

The electric motor 20 is powered so as to cause firstly an approach movement of the pusher 12 from a waiting position that is remote from the stack of disks to a position where it is in contact with the stack of disks, and secondly a pressure-applying displacement acting on the stack of disks to apply braking pressure equal to a nominal pressure which is determined as a function of the desired intensity of braking.

When the nominal pressure is applied, the pusher 12 is in compression, and the sleeve 18 is in extension under the same force as that to which the pusher 12 is subjected. The roller abutment 21 transmits this force to the washer 22, and thus to the piezoelectric assembly 23, which is therefore in compression under the same force as the force to which the pusher 12 is subjected.

Taking a reading of the potential difference across the terminals of the piezoelectric assembly 23 thus gives a direct measurement representative of the force to which the pusher 12 is subjected, and thus of the pressure it is imparting to the stack of disks (forward piezoelectric effect).

Advantage can be taken of this characteristic to make use of the piezoelectric assembly 23 as a force sensor during stages in which it is not actively in use for modulating braking, e.g. when applying a parking brake force. For this purpose, the actuator is associated with a device that measures the voltage across the terminals of the piezoelectric assembly 23, which means may be contained, for example, in a control unit 25 for the actuator.

With aircraft brakes, it is conventional to modulate the braking pressure so as to avoid the wheel 1 locking, where locking is characterized by a sudden drop in the speed of rotation of said wheel. In known actuators that are not fitted with a piezoelectric assembly, it is the electric motor that is controlled in order to modulate the braking pressure.

In this case, the piezoelectric assembly 23 is used to modulate braking, with the motor 20 being used only to provide the approach movement and the pressure-applying movement of the pusher 12. For this purpose, an electric voltage is applied across the terminals of the piezoelectric assembly 23 so as to cause the axial length of the piezoelectric assembly 23 to vary. This variation can thus lead to a small axial displacement of the sleeve 18 (of the order of a few hundredths of a millimeter), and thus of the pusher 12, in the direction tending to modulate, i.e. decrease or increase, the force exerted by the pusher 12 on the stack of disks. It is thus possible to reduce the piezoelectric effect relative to a maximum static force, or conversely to use the piezoelectric effect to increase the force applied to the stack of disks starting from a minimum static force. During this time, the motor 20 is kept stationary in its angular position. The displacement of the pusher obtained in this way is of the order of a few hundredths of a millimeter, which, given the stiffness of the brake and of the stack of disks, is quite sufficient to lead to significant variation in the braking force.

The use of a second drive member for modulating braking presents several advantages.

Figure 3:
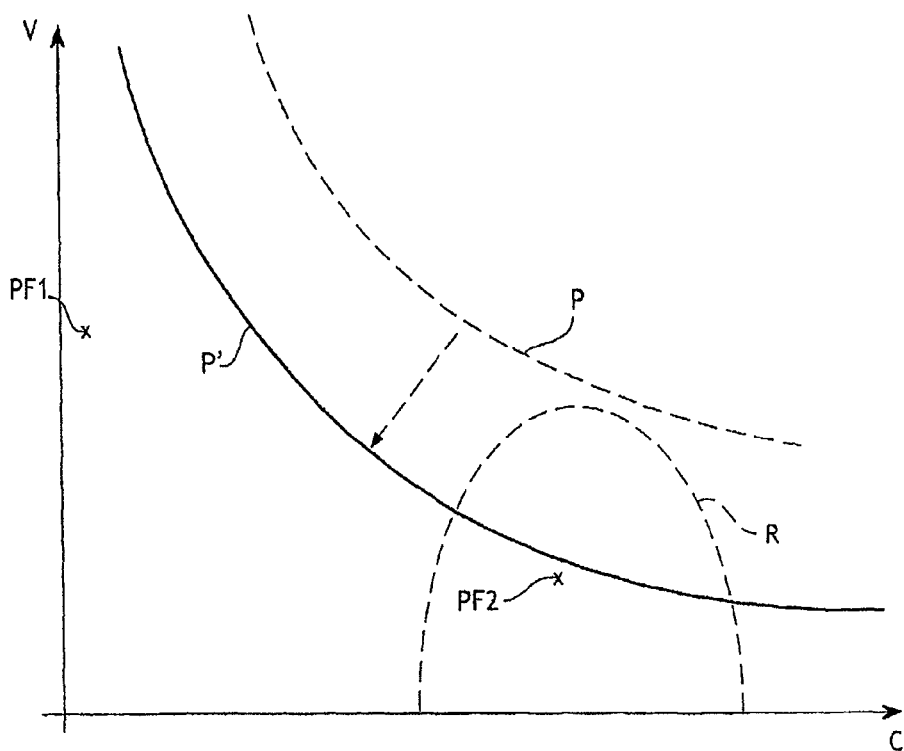
FIG. 3 is a torque/speed diagram showing how the electric motor of the actuator shown in FIG. 2 is selected.

With reference firstly to the electric motor 20, it is found that the approach movement is performed at negligible torque and at high speed. This corresponds to an operating point PF1 shown in the diagram of FIG. 3. Concerning pressure-applying displacement, this is performed under a high level of torque, but at low speed. This corresponds to an operating point PF2 on the same diagram.

If braking modulation were to be performed using the same electric motor 20, then it would be necessary for the motor to be capable of operating at operating points lying in the region R that is outlined in a dashed line in the diagram, corresponding to rapid movements under high torque that are characteristic of modulating braking pressure. This option would then make it necessary to select an electric motor of power P (characteristic represented by a dashed line) that needs to be compatible with all of the desired operating points.

However, when braking pressure modulation is provided by the piezoelectric assembly 23, the electric motor 20 no longer needs to be capable of occupying those operating points situated in the region R of the diagram that corresponds to modulating braking pressure, but needs to be capable only of occupying operating points PF1 and PF2. It is then possible to select a motor of power P' (whose characteristic is illustrated by a continuous line in FIG. 3) that is considerably less than the power P.

The electric motor 20 as selected in this way is thus much lighter in weight, and consumes considerably less electricity.

With reference to the piezoelectric assembly 23, this is particularly well adapted to performing modulation of the braking pressure. The piezoelectric assembly 23 presents a response that is very fast compared with that of the electric motor which is handicapped by considerable inertia, thus making it possible for the piezoelectric assembly to achieve displacement speeds that are very high, and particularly advantageous for modulating braking pressure. The limited stroke of the piezoelectric assembly 23 is nevertheless compatible with the stroke needed for modulating braking pressure, given the high level of stiffness of the brake in the axial direction.

Thus, by using two drive members, specifically the electric motor 20 and the piezoelectric assembly 23, each dedicated to a particular task, the operation of the actuator is optimized, while obtaining an appreciable saving in weight.

Another advantage of the dispositions of the invention lies in the fact that the requirements for efficiency and accuracy in the system transmitting drive from the electric motor 20 to the pusher 12 can be relaxed significantly. In a conventional electromechanical actuator without a piezoelectric assembly, it is important to achieve excellent efficiency in order to avoid friction losses which lead to heating and to high consumption of electricity, and it is also necessary to have high accuracy in order to be able to control finely the braking pressure that is applied. In the actuator of the invention, accuracy concerning the pressure applied by means of the electric motor 20 can be relaxed insofar as the piezoelectric assembly 23 regulates braking pressure. Relaxing efficiency and accuracy requirements thus makes it possible to achieve significant savings in manufacture of the actuator.

The drive system between the electric motor 20 and the pusher 12 may also be designed to be irreversible, which is difficult to envisage with a conventional electromechanical actuator. The main drawback associated with irreversibility is the risk of jamming. To avoid this risk, conventional actuators are designed with a drive system that is reversible, which means that the electric motor must be continuously powered during braking in order to maintain the braking force, and which means that a blocking member needs to be provided to ensure that blocking pressure is maintained on the brake when the airplane is at a standstill and the electric motor is not powered.

By means of the piezoelectric assembly 23, the risk of jamming is considerably reduced. Before operating the electric motor 20 in the reverse direction to move the pusher 12 away from the stack of disks, an electric voltage is applied to the terminals of the piezoelectric assembly 23 to cause said assembly to contract by a desired amount. This contraction leads to significant reduction in braking pressure, thus enabling the pusher 12 to be entrained by the electric motor 20. It is thus possible to provide an irreversible drive system between the electric motor 20 and the pusher 12, thus making it possible not only to cut off the power supply to the electric motor once the desired level of pressure has been applied, thereby achieving significant power savings, but also to omit a blocking member.

Figure 4:
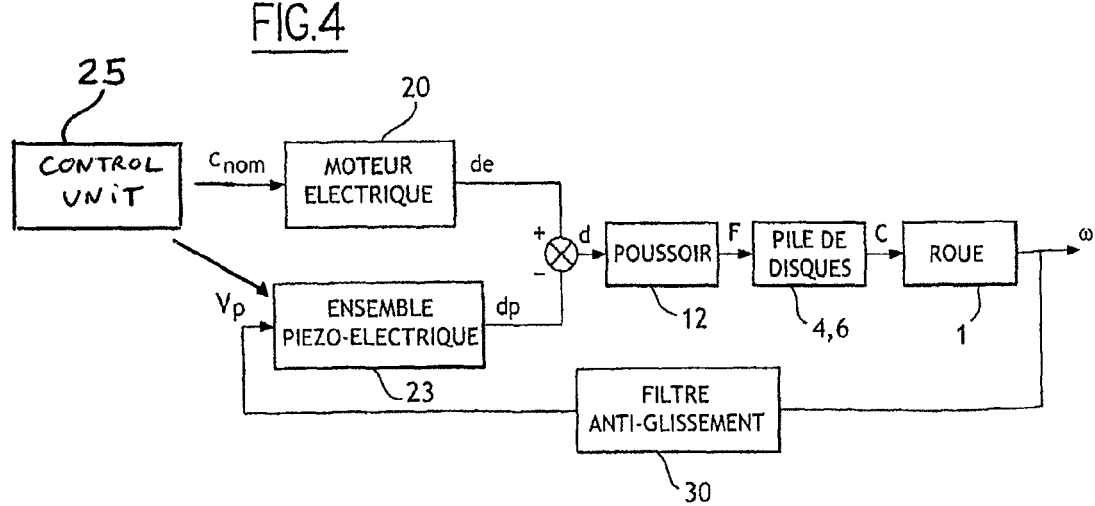
FIG. 4 is a block diagram of a circuit for controlling the FIG. 2 actuator.

FIG. 4 shows one way of controlling the electric motor 20 and the piezoelectric assembly 23.

The reference angular position $C_{nom}$ for the electric motor 20 is generated by a braking calculator (not shown). This reference corresponds to the nominal braking pressure that is selected as a function of the desired intensity of braking. This reference is either constant or else varies slowly.

The electric motor 20 then moves the pusher 12 in response to the reference $C_{nom}$, thereby moving the pusher 12 through a distance $d_e$.

This movement may be shortened by a distance $d_p$ that is the result of applying a reference voltage $V_p$ across the terminals of the piezoelectric assembly 23. The resulting movement of the pusher 12 is thus equal to:

$$d=d_e-d_p$$

Given the axial stiffness of the brake, this movement d leads to a corresponding braking pressure being applied to the stack of disks, which pressure in turn generates a braking torque C on the wheel 1. The reduction in the speed of rotation of the wheel 1 is measured in order to detect any wheel slip. An anti-slip filter 30 makes use of this measurement of speed of rotation in order to generate the reference voltage $V_p$ (which is zero when there is no slip).

The invention is not limited to the particular features of the invention described above, but on the contrary covers any variant coming within the ambit of the invention as defined by the claims.

In particular, although it is stated above that the piezoelectric assembly itself provides all of the modulation of braking pressure, it is possible, while remaining within the ambit of the invention, to control the electric motor 20 in such a manner that it provides a part only of this modulation. This can apply in particular if the stroke of the piezoelectric assembly does not enable it to achieve almost complete relief of the braking pressure, which can be necessary, for example, if the wheel is on a sheet of ice. Under such circumstances, the electric motor is controlled so as to release the braking pressure, thereby assisting the piezoelectric assembly. Thus, under most braking conditions, all modulation of the braking pressure is provided by the piezoelectric assembly. It is only under certain exceptional circumstances that the piezoelectric assembly is assisted by the electric motor. Under such situations, the piezoelectric assembly provides only a portion of the modulation of braking pressure.

Although a unitary piezoelectric assembly is shown, it would also be possible to provide an assembly made up of a plurality of unitary elements arranged in series.

Although a piezoelectric assembly is shown as being tubular in structure, it is possible to use other arrangements, for example a plurality of piezoelectric bars disposed parallel to one another around a tubular surface, the piezoelectric bars then operating in parallel.

In another arrangement, it would also be possible to provide a single piezoelectric bar extending along the axis of the pusher, i.e. inside said pusher, while still having one end that is stationary.

What is claimed is:

1. An actuator for an electromechanical brake, the actuator comprising a pusher and a first drive member arranged to move the pusher in register with a stack of disks and to apply a braking pressure to the stack of disks, the actuator including a second drive member comprising a piezoelectric assembly suitable for modulating the braking pressure applied to the stack of disks, wherein the piezoelectric assembly is embedded within a fixed part of said actuator that is not movable; and said actuator further comprising:
   a housing in which the pusher slides along a sliding axis;
   a sleeve disposed inside the housing around the pusher to turn about said sliding axis and connect the sleeve to said pusher via a helical connection;

an electric motor forming the first drive member which is disposed inside the housing around the sleeve and which is arranged to drive said sleeve in rotation; and the piezoelectric assembly which is tubular in shape and which is disposed inside the housing and around the electric motor, said piezoelectric assembly having a stationary end and another end forming an axial abutment for the sleeve, the piezoelectric assembly being arranged to cause the sleeve to move in a direction parallel to the sliding axis.

2. An actuator according to claim 1, wherein the electric motor is connected to the pusher via an irreversible drive system.

3. An actuator according to claim 1, the actuator being associated with a control unit that measures an electric voltage across the ends of the piezoelectric assembly.

4. An electromechanical brake including at least one actuator according to claim 1.

5. A vehicle including at least one brake according to claim 4.

6. A method of implementing an actuator for an electromechanical brake according to claim 1, wherein an electric voltage is taken from across the ends of the piezoelectric assembly, at least while the actuator is not active.

7. The actuator according to claim 1, wherein the first drive member is configured to move the pusher by rotating the sleeve, and wherein the second drive member is configured to modulate the braking pressure by translating the sleeve.

8. The actuator according to claim 7, wherein the piezoelectric assembly is configured to move the pusher by about a few of hundredths of a millimeter.

9. An actuator according to claim 1, further comprising a control unit that controls the electric motor for moving the pusher and that controls the voltage across the piezoelectric assembly of the second drive member for modulating the braking pressure.

10. The actuator according to claim 1, wherein the piezoelectric assembly is configured to move the pusher on the order of a few hundredths of a millimeter.

11. The actuator according to claim 1, wherein the piezoelectric assembly is constrained to move axially and prevented from rotating about the pusher.

12. The actuator according to claim 1, further comprising a control unit that controls the voltage across the piezoelectric assembly of the second drive member for modulating the braking pressure.

* * * * *